United States Patent [19]

Dobbelstein et al.

[11] Patent Number: 5,003,025
[45] Date of Patent: Mar. 26, 1991

[54] PROCESS FOR THE PREPARATION OF WATER DILUTABLE BINDERS FOR CATIONIC ELECTROCOATING FINISHES USING MONOFUNCTIONALLY MODIFIED POLYEPOXIDES

[75] Inventors: Arnold Dobbelstein; Michael Geist; Günther Ott, all of Münster; Georg Schön, Everswinkel, all of Fed. Rep. of Germany

[73] Assignee: BASF Lacke & Farben Aktiengesellschaft, Münster, Fed. Rep. of Germany

[21] Appl. No.: 453,343

[22] Filed: Dec. 20, 1989

Related U.S. Application Data

[63] Continuation of Ser. No. 318,115, Mar. 2, 1989, abandoned, Ser. No. 9,336, Jan. 23, 1987, Pat. No. 4,824,927.

[30] Foreign Application Priority Data

May 24, 1985 [DE] Fed. Rep. of Germany ....... 3518732

[51] Int. Cl.$^5$ ..................... C08G 59/50; C08L 63/02; C09D 5/44
[52] U.S. Cl. ......................................... 528/45; 528/73; 528/88; 528/90; 528/93; 528/103; 528/104; 528/108; 528/109; 528/110; 528/111; 528/113; 528/122; 528/341; 528/354; 528/361; 528/365; 528/367; 528/374; 528/406; 528/407; 528/408; 525/408; 525/415; 525/507; 525/510

[58] Field of Search .............. 528/45, 73, 88, 90, 528/93, 103, 104, 108, 109, 110, 111, 113, 122, 341, 354, 361, 365, 367, 374, 406, 407, 408; 525/408, 415, 507, 510, 528; 523/414, 415, 416, 417; 204/181.7

[56] References Cited

U.S. PATENT DOCUMENTS

| 4,031,050 | 6/1977 | Jerabek | 523/415 |
| 4,593,078 | 6/1986 | Kooymans et al. | 532/404 |
| 4,609,691 | 9/1986 | Geist et al. | 523/415 |
| 4,624,974 | 11/1986 | Geist et al. | 523/415 |
| 4,661,541 | 8/1987 | Batzill et al. | 523/415 |
| 4,780,524 | 10/1988 | Dobblestein et al. | 528/104 |
| 4,824,927 | 4/1989 | Dobbelstein et al. | 523/415 |

Primary Examiner—Earl Nielsen
Assistant Examiner—Frederick Krass
Attorney, Agent, or Firm—Kenyon & Kenyon

[57] ABSTRACT

The invention relates to water-dilutable binders for cationic electrocoating finishes. For the preparation of the binders, a di-epoxide compound, together with at least one mono-epoxide compound if desired, is converted by a polyaddition, carried out at 100° to 195° C. and initiated by a monofunctionally reacting initiator carrying either an alcoholic OH group, a phenolic OH group or an SH group, to form an epoxy resin which then subsequently is modified with (A) primary and/or secondary amines or their salts and/or the salt of a tertiary amine, a sulfide/acid mixture or a phosphine/acid mixture and with, if desired,
(B) a polyfunctional alcohol, a polycarboxylic acid, a polysulfide or a polyphenol.

6 Claims, No Drawings

PROCESS FOR THE PREPARATION OF WATER DILUTABLE BINDERS FOR CATIONIC ELECTROCOATING FINISHES USING MONOFUNCTIONALLY MODIFIED POLYEPOXIDES

This application is a continuation of application Ser. No. 318,115, filed Mar. 2, 1989, now abandoned which is a division of application Ser. No. 009,336, filed Jan. 23, 1987, now U.S. Pat. No. 4,824,927.

The present invention relates to water-dilutable binders for cationic electrocoating ammonium, sulfonium and/or phosphonium groups.

Cationic electrocoating is a coating process frequently used especially for priming, in which synthetic resins carrying water-dilutable cationic groups are deposited by direct current on electrically conducting objects.

The use of modified epoxy resins as binders for cationic electrocoating finishes is known (U.S. Pat. No. 4,104,147; U.S. Pat. No. 4,260,7200.

Modified epoxy resins that have been hitherto available for use in cationic electrocoating finishes are only poorly compatible with aliphatic hydrocarbons, are in need of improvement in respect of their flexibility and give rise to coatings that cannot be overcoated without problems and whose thickness should be further increased.

An object of the present invention was to develop novel modified epoxy resins that would be free from the disadvantages outlined above.

The object according to the invention was achieved by the development of binders which were prepared by (a) a polyaddition of a di-epoxide compound and/or a mixture of di-epoxide compounds, together with at least one monoepoxide compound if desired, carried out at 100 to 195° C., if desired in the presence of a catalyst, initiated by a monofunctionally reacting initiator carrying either an alcoholic OH group, a phenolic OH group or an SH group, to form an epoxy resin in which the di-epoxide compound and the initiator are incorporated in a molar ratio of >2:1 to 10:1, and by a subsequent (b) modification of the epoxy resin obtained from (a) with (A) a primary and/or secondary amine or their salts and/or the salt of a tertiary amine, a sulfide/acid mixture of phosphine/acid mixture or a mixture of these compounds, and, if desired, with (B) a polyhydric alcohol, a polycarboxylic acid, a polyamine, a polysulfide, a polyphenol or a mixture of these compounds and, if desired, (c) by protonization with a water-soluble acid.

It was found that the modified epoxy resins prepared by the polyaddition described above and subsequent modification with the component (A) are distinguished by good compatibility with aliphatic hydrocarbons and high elasticity. Their use as binders in cationic electrocoating finishes leads to the deposition of thick coatings which can be readily overcoated.

Additional reaction with the component B can lead to a further increase in elasticity of the modified epoxy resins as well as to an additional increase in the thickness of the deposited coatings.

In addition, the novel modified epoxy resins have the advantage of being preparable from readily accesible raw materials.

All compounds which contain two reactive epoxide groups and have an epoxide equivalent weight below 500, can be used as the di-epoxide compounds.

Diglycidyl ethers of polyphenols, prepared from polyphenols and epihalohydrins, are particularly preferred epoxide compounds. Examples of polyphenols which can be used are:

Very particularly preferred: bisphenol A and bisphenol F particularly preferred: 1,1-bis-(4-hydroxyphenyl)n-heptane. Other suitable compounds are 4,4'-dihydroxybenzophenone, bis-(4-hydroxyphenyl)-1,1-ethane, bis-(4-hydroxyphenyl)-1,1-isobutane, bis-(4-hydroxy-tert-butylphenyl)-2,2-propane, bis-(2-hydroxynaphthyl)methane, 1,5-dihydroxynaphthalene and phenolic novalak resins.

Preferred epoxide compounds are also diglycidyl ethers of polyhydric alcohols such as ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)-2,2-propane.

Diglycidyl esters of polycarboxylic acids, for example oxalic acid, succinic acid, glutaric acid, terephthalic acid, 2,6-naphthalenedicarboxylic acid, dimerized linolenic acid, etc., can be also used. Typical examples are glycidyl adipate and glycidyl phthalate.

Other suitable compounds are hydantoin epoxides, epoxidized polybutadiene and di-epoxide compounds, obtainable by epoxidization of an olefinically unsaturated alicyclic compound.

Besides the di-epoxide compounds, mono-epoxide compounds can also be used as additional starting materials for the polyaddition.

All compounds which contain only one epoxide group, are in principle suitable.

Examples of mono-epoxide compounds which are preferably used are phenyl glycidyl ether and the blycidyl esters of versatic and (meth)acrylic acid.

All compounds which react monofunctionally under the reaction conditions prevailing at the start of the polyaddition and contain an alcoholic OH group, a phenolic OH group or an SH group can be used as initiators.

The initiators used can be compounds of the general formula $$R^1-OH$$

in which $R^1$ can have the following meaning $R^1$ = alkyl (preferably of 1 to 20 carbon atoms, particularly preferably methyl, ethyl, (iso)propyl, (iso)butyl, (iso)amyl, 2-ethylbutyl, 2-ethylhexyl, isononyl, isodecyl, isotridecyl, isohexadecyl, isooctadecyl, neopentyl, 3,7-dimethyl-3-octyl, 3-cyclohexylpropyl, 2,4-dimethyl-3-pentyl).

= alkenyl (particularly preferably 1-buten-3-yl, 2-methylbut-3-en-2-yl, 3-methylpent-1-en-3-yl = $R^2$-X-$R^3$-, in which $R^2$ = alkyl (of 1 to 6 carbon atoms, preferably methyl, ethyl, butyl or hexyl) or phenyl $R^3$ = $CH_2CH_2$—$(OCH_2—CH_2)n$— with n=0 to 10, especially 1, 1 and 2, propyl or butyl X = O or S = cycloalkyl, particularly preferably cyclohexyl, preferably 4-tert-butylcyclohexyl = aryl, particularly preferably

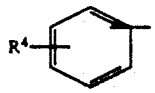

in which
R$^4$=H, alkyl (preferably of 1 to 20 carbon atoms, particularly preferably tert-butyl, nonyl and dodecyl)
R$^4$=R$^5$—O— (preferably in the para-position to the phenolic OH group) in which
R$^5$=alkyl (preferably of 1 to 10 carbon atoms, particularly preferably methyl)
R$^1$=aralkyl, preferably benzyl, 4-methylbenzyl, phenylethyl, 2-phenylprop-1-yl
or a compound of the general formula R$^6$-SH, in which
R$^6$ can have the following meaning
R$^6$=alkyl (preferably of 1 to 20 carbon atoms, particularly preferably n-butyl and dodecyl)
=R$^7$—OOC(CH$_2$)$_n$— in which n=1 or 2 and
R$^7$=alkyl radical of 1 to 8 carbon atoms (preferably butyl or 2-ethylhexyl)
=cycloalkyl, particularly preferably cyclohexyl
=aryl, particularly preferably phenyl
=aralkyl, particularly preferably benzyl or a mixture of these compounds.

In addition, monofunctions propolymers, for example reaction products of one of the monofunctional compounds mentioned above with lactones, for example ε-caprolactone, can be also used as initiators.

Primary or secondary amines and their salts, salts of tertiary amines, sulfide/acid mixtures of phosphine/acid mixtures or a mixture of these compounds can be used as component A, the secondary amines being especially preferred components A.

The amine should preferably be a water-soluble compound. Example of such amines are mono- and dialkylamines, such as methylamine, ethylamine, propylamine, butylamine, dimethylamine, diethylamine, dipropylamine, methylbutylamine and the like. Alkanolamines, for example methylethanolamine, diethanolamine and the like, are likewise suitable. Dialkylaminoalkylamines, for example dimethylaminoethylamine, diethylaminopropylamine, dimethylaminopropylamine and the like are also suitable.

In the majority of cases, low molecular weight amines are used, but it is also possible to use relatively high molecular weight monoamines.

Polyamines possessing primary and secondary amino groups can react with the epoxide groups in the form of their ketimines. The ketimines are prepared from the polyamines in a known manner.

The amines can also contain other groups, but these should not interfere with the reaction of the amine with the epoxide group, and equally, should not lead to gelling of the reaction mixture.

The charges required for dilutability with water and electrodeposition can be produced by protonation with watersoluble acids (for example boric acid, formic acid, lactic acid, propionic acid, butyric acid, hydrochloric acid, phosphoric acid, sulfuric acid, carbon dioxide and, preferably, acetic acid) or by reacting the oxirane groups with salts of an amine or a sulfide/acid mixture or phoshine/acid mixture.

The salt of a tertiary amine can be used as the salt of the amine.

The amine part of the amine acid salt is an amine which can be unsubstituted or substituted, as is the case with hydroxylamine, and these substituents should not interfere with the reaction of the amine acid salt with the polyepoxide and not cause gelling of the reaction mixture. Preferred amines are tertiary amines, such as dimethylethanolamine, triethylamine, trimethylamine, triisopropylamine and the like. Examples of other suitable amines are given in U.S. Pat. No. 3,839,525 in column 5, line 3 to column 7, line 42.

The amine/acid salt mixture is obtained by reaction of the amine with the acid in a known manner. Amine/acid mixtures can be also used, although they react as a rule with the formation of the acid salt.

A reaction of the oxirane groups with a sulfide in the presence of an acid gives rise to resins containing sulfonius groups.

Any sulfides which react with epoxide groups and do not contain groups that would interfere with the reaction can be used as sulfides. The sulfide can be an aliphatic, mixed aliphatic-aromatic, aralkyl or cyclic sulfide. Example of such sulfides are dialkyl sulfides, such as diethyl sulfide, dipropyl sulfide, dibutyl sulfide, dihexyl sulfide, or alkyl phenyl sulfides, such as diphenyl sulfide, ethyl phenyl sulfide or alicyclic sulfides, such as tetramethylene sulfide and pentamethylene sulfide, or hydroxyalkyl sulfides, such as thiodiethanol, thiodipropanol, thiodibutanol and the like.

Any acid which forms a tertiary sulfonium salt can be used as acid. An organic carboxylic acid is, however, preferred as the acid. Examples of suitable acids are boric acid, formic acid, lactic acid, acetic acid, propionic acid, butyric acid, hydrochloric acid, phosphoric acid and sulfuric acid. The acid has preferably a dissociation constant greater than about $1 \times 10^{-5}$.

The sulfide:acid ratio is not particularly critical. Since one equivalent of an acid is used for the formation of one mole of a sulfonium group, at least one equivalent of an acid is preferably used for each desired mole of the conversion of sulfide to sulfonium.

a reaction of the oxirane groups with a phosphine in the presence of an acid gives rise to resins containing phosphonium groups.

Any phosphine that contains no interfering groups can be used as phosphine. Examples of such phosphines are aliphatic, aromatic or alicyclic phosphines, the following phosphines being specific examples:

Low trialkylphosphines, such as trimethylphosphine, triethylphosphine, triporpylphosphine, tributylphosphine, or mixed low alkylphenylphosphines, such as phenyldimethylphosphine, phenyldiethylphosphine, phenyldipropylphosphine, diphenylmethylphosphine, diphenylethylphosphine, diphenylpropylphosphine, triphenylphosphine, or alicyclic phosphines, such as tetramethylene-ethylphosphine, and the like.

Any acid that forms a quaternary phosphonium salt can be used as the acid. An organic carboxylic acid is, however, preferred as the acid. Examples of suitable acids are boric acid, lactic acid, formic acid, acetic acid, propionic acid, butyric acid, hydrochloric acid, phosphoric acid and sulfuric acid.

The acid should preferably have a dissociation constant greater than about $10^{-5}$.

The phosphine:acid ratio is not especially critical. Since one equivalent of an acid is required for the formation of one mole of a phosphonium group, at least about one equivalent of an acid is preferably used for each mole of the desired conversion of phosphone to phosphonium.

The polyfunctional alcohols, polycarboxylic acids, polyamines or polysulfides suitable for use as component B have a molecular weight of from 300 to 3,500, preferably from 35 to 1,000.

The polyols suitable for the invention include diols, triols and higher polymeric polyols such as polyester polyols and polyether polyols.

The polyalkylene ether polyols suitable for component B correspond to the general formula:

in which R=hydrogen or a low alkyl radical, if desired with various substituents, n=2 to 6 with m=3 to 50 or even higher. Examples are poly(oxytetramethylene) glycols and poly(oxyethylene) glycols.

The preferred polyalkylene ether polyols are poly(oxytetramethylene) glycols with a molecular weight in the range from 350 to 1,000.

Polyester polyols can likewise be used as the polymeric polyol components (component B) in the invention. The polyester polyols can be prepared by polyesterification of organic polycarboxylic acid or their anhydrides with organic polyols containing primary hydroxyl groups. The polycarboxylic acids and the polyols are usually aliphatic or aromatic dicarboxylic acid and diols.

The diols used for the preparation of the polyesters include alkylene glycols, such as ethylene glycol, butylene glycol, neopentyl glycol, and other glycols, such as cyclohexanedimethanol.

The acid component of the polyester consists primarily of low molecular weight carboxylic acids or their anhydrides with 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid, maleic acid and glutaric acid. The corresponding anhydrides, in so far as these exist, can be used instead of these acids.

In addition, polyester polyols derived from lactones can be also used as component B in the invention. These products are obtained by the reaction of a ε-caprolactone with a polyol. Such products as described are described in U.S. Pat. No. 3,169,945.

The polylactone polyols, obtained by this reaction are distinguished by the presence of a terminal hydroxyl group and by recurring polyester moieties derived from the lactone. These recurring molecular moieties can correspond to the formula

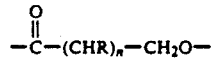

in which n is at least 4, preferably 4 to 6, and the substituent is hydrogen or an alkyl, a cycloalkyl or an alkoxy radical.

Long-chain dicarboxylic acids are used in a further advantageous embodiment of the invention. Examples of these are dimeric fatty acids, such as, for example, dimeric linoleic acid.

Polyamines which are suitable for rendering the coatings elastic can be produced by, for example, reacting primary diamines with monoepoxides. The secondary, substituted diamines formed modify the epoxy resins according to the invention in a suitable manner.

Primary-tertiary diamines or alkanolamines, such as aminoethanol or aminopropanol, can also be used as component B.

Reaction products of organic dihalides with sodium polysulfide are suitable polyfunctional SH compounds (component B). Other SH compounds are, for example, the reaction products of hydroxyl-containing linear polyesters, polyethers or polyurethanes with mercaptocarboxylic acids, such as mercaptoacetic acid, 2-mercaptopropionic acid, 3-mercaptopropionic acid, mercaptobutyric acid and the like.

Polyphenols which are suitable as component B correspond to the general formula (I) explained above.

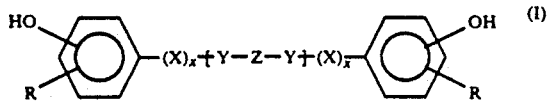

This component B can be advantageously prepared, for example, in the following manner. One mole of a high-molecular diol, for example a polyester diol, a polycaprolactone diol, a polyether diol, a polycarbonate diol or the like, is esterified with two moles of a hydroxyphenylcarboxylic acid or is reacted with two moles of a hydroxyphenylcarboxylic acid ester. Suitable hydroxycarboxylic acids are p-hydroxybenzoic acid, p-hydroxyphenylacetic acid and 3-(4-hydroxyphenyl)propionic acid or their esters. If the introduction of the hydroxyphenyl group is carried out by transesterification, a basic transesterification can also be carried out using the alkali metal phenolates of the corresponding hydroxyphenylcarboxylic acid esters. To obtain the desired polyphenol, it is necessary to work up the product at the end of the reaction under acid conditions.

N-94-hydroxyphenyl)glycine, for example, can also be used for direct esterification. In a further variant, any acid polyesters can be reacted with p-hydroxyaniline to give the desired polyphenols.

In another advantageous embodiment, polyether diamines or similar polyamines are reacted, with, for example, 4-hydroxy-3-methoxybenzaldehyde to form the polyphenols.

The binders prepared according to the invention can be crosslinked by methods known per se by the addition of crosslinking agents or converted to self-crosslinking system can be obtained, for example, by reacting the binder with a partially blocked polyisocyanate which has an average one free isocyanate group per molecule and whose blocked isocyanate groups only become unblocked at elevated temperatures.

Virtually all at least bifunctional compounds which react with oxirane groups, for example polyalcohols, polyphenols, polycarboxylic acids, polycarboxylic acid anhydrides and acid amides, polyamines, polyisocyanates, phenoplasts, etc., are suitable crosslinking agents.

The crosslinking agents are usually used in amounts from 5 to 60, preferably from 20 to 40, % by weight, based on the binder.

Methods that are frequently used for the crosslinking of binders are published, for example, in the following patent documents: British Patent No. 1,303,480 European Patent Application No. 12,463 U.S. Pat. No. 4,252,703 and British Patent No. 1,557,516.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexamethyl ether of hexamethylolmelamine, and polymeric butylated melamine-formaldehyde resins. Alkylated urea-formaldehyde resins are likewise suitable.

Blocked polyisocyanates are preferably used as crosslinking agents. In the invention, any polyisocyanate can be used whose isocyanate groups are reacted with a compound in such a manner that the blocked polyisocyanate formed is non-reactive toward hydroxyl groups at room temperature, but reacts at elevated temperatures, usually in the region from about 90 to about 300° C. To prepare the blocked polyisocyanates, any organic polyisocyanates suitable for the crosslinking can be used. The isocyanates which contain from about 3 to about 36, in particular from about 8 to about 15 carbon atoms, are preferred. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-diphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcylcohexene. Polyisocyanates of higher isocyanate functionality can also be used. Examples of these are tris(4-isocyanatophenyl)methane, 1,3,5-triisocyanatobenzene, 2,4,6-triisocyanatotoluene, 1,3,5-tris(6-isocyanatophexyl)biuret, bis(2,5-diisocyanato-4-methylphenyl)methane, and polymeric polyisocyanates, such as dimers and trimers of diisocyanatotoluene. In addition, mixtures of polyisocyanates can also be used. Organic polyisocyanates suitable as crosslinking agents in the invention can also be prepolymers derived, for example, from a polyol, including a polyether polyol or a polyester polyol.

Any suitable aliphatic, cycloaliphatic or aromatic alkyl monoalcohols can be used for the blocking of the polyisocyanates. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohols; cycloaliphatic alcohols such as cyclopentanol and cyclohexanol; aromatic alkyl alcohols, such as phenylcarbinol and methylphenylcarbinol.

Other suitable blocking agents are hydroxylamines such as ethanolamine, oximes such as methyl ethyl ketone oxime, acetone oxime and cyclohexanone oxime, or amines such as dibutylamine and diisopropylamine.

The polyisocyanates and blocking agents mentioned can also be used, in suitable proportions, for the preparation of the partialy blocked polyisocyanates described above.

The usual additives, such as, for example, coalescing solvents, pigments, surfactants, crosslinking catalysts, antioxidants, fillers and anitfoams, can be added to the aqueous coating compositions prepared using the binders according to the invention.

The aqueous systems prepared with the aid of the binders according to the invention are especially suitable for the cationic electrocoating process; they can, however, also be used in conventional coating processes. Metals, for example, pretreated if desired, such as iron, steel, copper, zinc, brass, magnesium, tin nickel, chromium and aluminum, can be used as the coating substrate, and also impregnated paper and other electrically conducting substrates.

The binders according to the invention are also suitable for the preparation of pigment pastes, ie. the binders can also be used as grinding resins.

When the resin according to the invention is used as grinding resin for the preparation of a pigment paste, the proportions of the epoxide-containing organic material and the organic tertiary amine which are reacted with one another are preferably chosen such that the carrier resin contains 0.8 to 2.0 nitrogen atoms per molecule. Lower amounts of quaternary nitrogen can lead to poor pigment wettability, while higher amounts result in the resins being too water-soluble.

Pigment pastes according to the invention are prepared by comminuting or dispersing a pigment in the grinding resin in well-known manner. The pigment paste contains the grinding resin and at least one pigment as the essential ingredients.

In addition, however, other usual additives can be present in the pigment composition, such as plasticizers, wetting agents, surfactants or antifoams.

The grinding of the pigments usually takes place in ball mills, sandmills, Cowles mills and continuous mills, until the pigment has been comminuted to the desired particle size and preferably is wetted by the resin or dispersed in it. After the comminution, the particle size of the pigment should be in the region of 10 microns or less. In general, comminution is carried out to a Hegman number of from about 6 to 8. The grinding is preferably carried out in an aqueous dispersion of the grinding resin. The amount of water present in the composition to be ground should be sufficient to form a continuous aqueous phase.

The well-known pigments can be used as pigments in the invention. Titanium dioxide is in general the sole or principal white pigment. However, other white pigments or extenders, such as antimony oxide, zinc oxide, basic lead carbonate, basic lead sulfate, barium carbonate, porcelain, clay, calcium carbonate, aluminum silicate, silica, magnesium carbonate and magnesium silicate can also be used. Examples of colored pigments which can be used, are cadmium yellow, cadmium red, carbon black, phthalocyanine blue, chromium yellow, toluidine red and hydrated iron oxide. For further general hints on comminution of pigments and formulation of coating compositions, the following books should be referred to; D. H. Parker, Principles of Surface Coating Technology, Interscience Publishers, New York (1965) R. L. Yates, Elektropainting, Robert Draper Ltd., Teddington England (1966) H. F. Payne, Organic Coating Technology, Volume 2, Wiley and Sons, New York (1961).

The modified epoxy resins should be capable of preparation on an industrial scale with as few problems as possible.

The invention also relates to a process for the preparation of water-dilutable binders for cationic electrocoating finishes based on modified epoxy resins, containing ammonium, sulfonium and/or phosphonium groups.

In the synthesis as well as the modification of epoxy resins, epoxide groups are opened with the formation of secondary hydroxyl groups. The secondary OH groups formed in this way can in turn undergo an addition reaction with an epoxide group, forming an ether bond and a new secondary hydroxyl group.

In the industrial production of modified epoxy resins, difficulties may arise due to a failure to control the reaction by a suitable choice of reaction conditions to ensure that a sufficient number of reactive epoxide groups are available for carrying out the desired modification reactions and that no resins with excessively high viscosity and no unusable gels are obtained as reaction products.

Attempts have previously been made to avoid the production difficulties outlined above by very substantially suppressing the reaction between secondary hydroxyl groups and epoxide groups.

Thus, for example, it has been proposed to minimize the tendency to gel formation during the preparation of modified epoxy resins by a chain-lengthening using organic polyols carrying at least two primary alcoholic OH groups (U.S. Pat. No. 4,104,147) or polymercapto compounds (U.S. Pat. No. 4,260,720). The objective was to suppress reactions between the secondary hydroxyl groups and the epoxide groups by reactions of the alcoholic primary OH groups more reactive toward epoxide groups, or mercapto groups, with the epoxide groups.

However, this method of controlling the reaction has the disadvantage that at least 2 new secondary hydroxyl groups are formed in each chain-lengthening step.

A further object of the present invention was to find better ways for solving the production difficulties described above.

Surprisingly, this object was achieved by preparing the modified epoxy resins by a process in which a di-epoxide compound and/or a mixture of di-epoxide compounds, together with at least one mono-epoxide compound if desired, are converted to an epoxy resin in which the di-epoxide compound and the initiator are incorporated in a molar ratio of >2:1 to 10:1, by a polyaddition reaction initiated by a monofunctionally reacting initiator carrying either an alcoholic OH group, a phenolic OH group or an SH group, and carried out at 100 to 195° C., if desired in the presence of a catalyst; and by subsequently modifying the epoxy resin obtained in this manner by a reaction with (A) primary and/or secondary amines or their salts and/or the salt of a tertiary amines a sulfide/acid mixture or phosphine/acid mixture or a mixture of these compounds, and, if desired, with (B) a polyfunctional alcohol, a polycarboxylic acid, a polyamine, a polysulfide, a polyphenol or a mixture of these compounds and in which the water-dilutability is obtained, if desired, by protonization with a water-soluble acid.

As demonstrated by the reaction scheme given below, the epoxy resin molecules, formed by a polyaddition reaction initiated by a monofunctionally reacting initiator, contain one single secondary hydroxyl group.

In the process according to the invention, the number of the secondary hydroxyl groups formed can be controlled in a simple manner in such a way that the production difficulties mentioned above do not occur and the reaction between secondary hydroxyl groups and epoxide groups occurring as undesirable side reaction can now be utilized as a purpose-controlled main reaction for resin synthesis.

The reaction scheme of the synthesis of the epoxy resin by a polyaddition reaction of di-epoxide compounds (for example bisphenol A diglycidyl ether) initiated by a monofunctionally reacting initiator (for example R—OH):

1. Initiation reaction

The initiator reacts with an epoxide group with the formation of a secondary hydroxyl group:

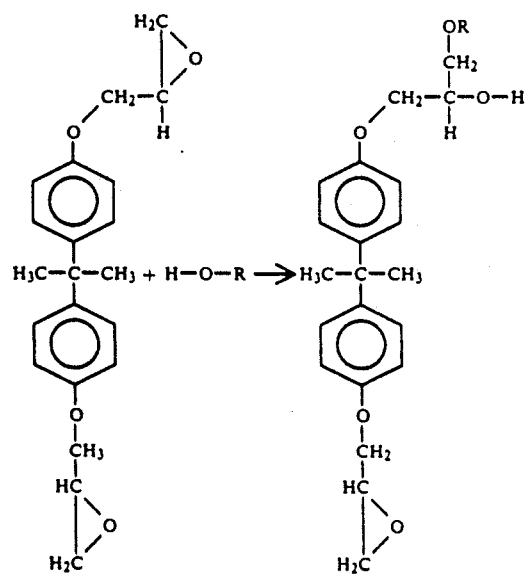

2. Reaction steps for synthesizing the resin

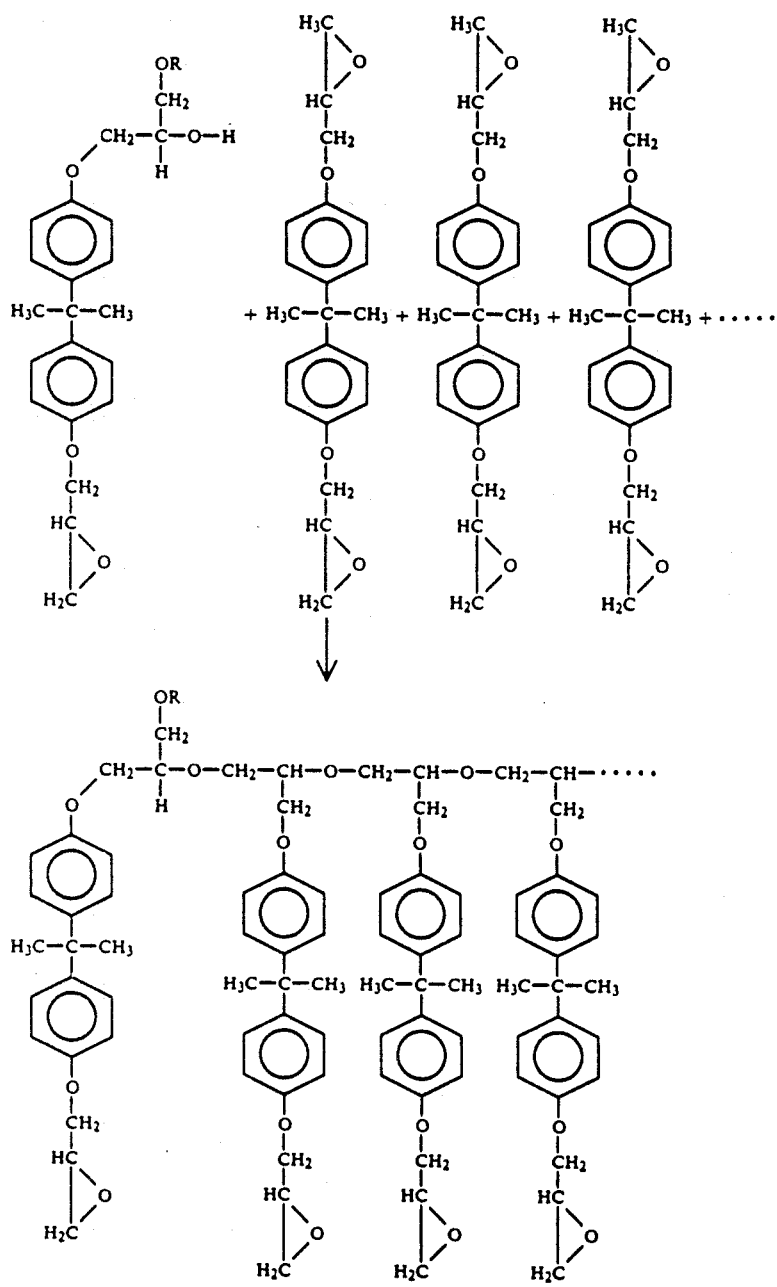

The process according to the invention is carried out in the following way:

The monofunctionally reactive initiator and the di-epoxide or mono-epoxide compounds are mixed in a molar ratio of 1:1 and allowed to react fully at temperatures between 100 and 195°0 C., preferably 115 and 195° C., in the presence or absence of a catalyst. (The completion of the reaction can be checked by determination of the epoxide equivalent weight.) Thereafter further di-epoxide or mono-epoxide compounds can be added under the same reaction conditions.

The polyaddition can also be carried out by allowing the total amount of the epoxide compounds to be used to react with the initiator in one step.

In both cases the reaction is arranged so that the polyaddition product incorporates the di-epoxide compound and the initiator in a molar ratio of >2:1 to 10:1.

This reaction product can then be modified with the component A and also, if desired, with the component B. The reaction with the component B can also take place before the reaction with the component A.

The reaction between amines and epoxide group-containing compound often sets in as early as when the reactants are mixed. Depending of the course of reaction desired, it is recommended to raise the reaction temperature to 50 to 150° C., mainly to allow the reaction to go to completion.

The amount of amine used for the reaction with the epoxide-containing compound should be at least such that the resin acquires a cationic character, ie. that it migrates to the cathode in the coating bath under the influence of a voltage, when it has been made soluble by the addition of an acid. Essentially, all epoxide groups of the resin can be reacted with an amine. However, it is also possible to leave an excess of epoxide groups in the resin.

A further possibility of achieving the required water dispersability consists of using Mannich bases, ie. reaction products of suitable phenols carrying groups capable of reacting with a epoxide ring, with formaldehyde and a secondary amine. In this way the binder becomes at the same time self-crosslinking.

The reaction with amine acid salts takes plate at temperatures from 20 to 110° C. The reaction can take place without the addition of solvents, but in the presence of solvents, such as aromatic hydrocarbons or monoalkyl ethers of ethylene glycol, it becomes more easily controllable.

The ratio between the amine acid salt and the epoxide compound can fluctuate and the optimum ratios depend on the specific starting materials. In general, about 1 to about 50 parts by weight of salt are used for 100 parts by weight of polyepoxide. In general, the ratio is chosen according to the content of nitrogen derived from the quaternizing agent, which typically is about 0.05 to about 16%, based on the total weight of the amine salt and the polyepoxide.

The sulfide/acid mixture and the epoxide compound are reacted by mixing the components and warming them, usually to moderately elevated temperatures, such as from 70 to 110° C. A solvent is unnecessary, although one is frequently used to control the reaction better. Suitable solvents are aromatic hydrocarbons, monoalkyl ethers or ethylene glycol and aliphatic alcohols. The proportions of the sulfide and the epoxide compound can vary, and the optimum ratios of the two components depend on the specific starting materials. However, about 1 to 50 parts by weight of sulfide are usually used per 100 parts by weight of the epoxide compound. The proportions are frequently based on the sulfur content, which typically is from about 0.1 to 35%, based on the total weight of the sulfide and the epoxide compound.

The phosphine/acid mixture and the epoxide compound are reacted by mixing the components, occasionally warming the reaction mixture to moderately elevated temperatures. The reaction temperature is not particularly critical and depends on the starting materials and their reaction velocities. The reaction is frequently satisfactorily rapid at room temperature or at temperatures raised to up to 70°. In some cases it is advisable to use higher temperatures, such as about 110° C. or higher. A solvent is unnecessary, although one can frequently be used to control the reaction better. Examples of suitable solvents are aromatic hydrocarbons, monalkyl ethers of ethylene glycol and aliphatic alcohols. The proportions of the phosphine and the epoxide compound can be varied and the optimum proportions depend on the specific starting materials. Normally, however, from about 1 to about 50 parts by weight of phosphine are used per 100 parts by weight of the epoxide compound. The proportions are frequently given with reference to the proportion of phosphine, about 0.1 up to about 35% by weight of phosphine, based on the total weight of phosphine and epoxide compound, being typically used.

The modification with the component B is carried out at reaction temperatures of 80 to 170° C. The course of the reaction of the polyaddition product with the components A and, if desired, B, can be followed by the respective determination of the epoxide equivalent weight.

The invention also relates to a process for the electrophoretic coating of an electrically conducting substrate connected as a cathode, in an aqueous bath which contains, besides the usual additives, water-dilutable cationic binders which have been either made self-crosslinkable by reaction or can be crosslinked by crosslinking agents present in the bath, wherein the binders are prepared by (a) a polyaddition of a di-epoxide compound and/or a mixture or di-epoxide compounds, together with at least one mono-epoxide compound if desired, carried out a 100 to 195° C., if desired in the presence of a catalyst, and initiated by a monofunctionally reacting initiator carrying either an alcoholic OH group, a phenolic OH group or an SH group, to form an epoxy resin in which the di-epoxide compound and the initiator are incorporated in a molar ratio of >2:1 to 10:1, and by a subsequent (b) modification of the epoxy resin obtained from (a) with (A) a primary and/or secondary amine or their salts and/or a salt of a tertiary amine, a sulfide/acid mixture or phosphine/acid mixture or a mixture of these compounds, as well as, if desired, with (B) a polyfunctional alcohol, a polycarboxylic acid, a polyamine, a polysulfide, a polyphenol or a mixture of these compounds, and, if desired, (c) by protonization with a water-soluble acid.

For the cationic deposition, the objects to be coated are immersed in an aqueous dispersion of the solubilized film-forming cationic binder. An electric voltage is applied between the object to be coated, which serves as the cathode, and an anode, and the cationic binder is deposited on the cathode with the aid of the electric current. The object is then removed from the bath and usually rinsed. The coating is then cured by warming in the usual manner.

Advantageous embodiments of the process according to the invention are outlined in claims 9 to 15.

The invention is further clarified by the examples below. All parts and percentages are by weight, unless expressly stated otherwise.

PREPARATION OF A CROSSLINKING AGENT I

A blocked isocyanate crosslinking agent (polyurethane crosslinking agent) is prepared according to German Offenlegungsschrift No. 2,701,002 Example 1, by adding, slowly and with stirring in a nitrogen atmosphere, 219 parts of 2- ethylhexanol to 291 parts of an 80/20 isomeric mixture of 2,4-/2,6-toluylene diisocyanate, the reaction temperature being maintained below 38° C. by external cooling. The reaction mixture is maintained at 38° C. for a further half hour and is then warmed to 60° C., after which 75 parts of trimethylolpropane are added, followed by 0.08 parts of dibutyltin dilaurate as catalyst. After an initial exothermic reaction the mixture is kept 1.5 hours at 121° C., until essentially all the isocyanate groups are used up, which is recognized from the infrared spectrum. The mixture is then diluted with 249 parts of ethylene glycol monoethyl ether.

PREPARATION OF CROSSLINKING AGENT II

A crosslinking agent which possesses β-alkoxyalkyl ester groups which are active in the crosslinking is prepared as follows:

1462 g of hexyl glycol (10 mol) are placed in a reaction vessel provided with a water separator, reflux condenser and interconnected Raschig column and heatable by heat-transfer oil, and 1000 g of succinic anhyride (10 mol) are added while passing in an inert gas and stirring. The reaction mixture is heated to 120° C., the exothermic heat of reaction briefly raising the temperature to 130° C. The temperature is maintained until the acid number reaches 230 mg of KOH/g.

400 g of xylene, 5 g of N-cetyl-N,N,N-trimethylammonium bromide and 940 g of a bisphenol A-epoxide resin with an epoxide equivalent weight of 188 (2.5 mol) are then added. The temperature is again raised to 130° C. in the course of one hour and maintained at this temperature until the epoxide value has dropped to zero. After an addition of 2 g of paratoluenesulfonic acid solution (25% in n-propanol), the temperature is raised to 200° C. in the course of 4 hours, during which time the reaction water formed is continuously removed. After a further temperature rise to 220° C., the temperature is maintained until about 90 g of water have separated off and the acid number has dropped to below 2 mg of KOH/g of solid resin. The reaction mixture is then cooled and discharged without dilution.

Solids: 95.2% by weight (measured by heating for 1 hour at 130° C.)
Acid number: 1.1 mg of KOH/g of solid resin
Viscosity: 480 mPas (measured after dilution with methyl isobutyl ketone to 70% by weight at 25° C.)

PREPARATION OF A CROSSLINKING AGENT III 2340 g of the glycidyl ester of 2-methyl-2-ethyl-heptanoic acid are heated in a reaction vessel with 2073 g of trimellitic acid anhydride to 130° C. A strongly exothermic reaction begins. The reaction is maintained at 150° C. by external cooling, until an acid number of 183 is reached. The reaction mixture is then cooled to 90° C. and 1450 g of methyl isobutyl ketone (MIBK) are added. Subsequently 835 g of propylene oxide are slowly added dropwise. The reaction is interrupted when an acid number of 2 is reached. The solids content of the resin solution is adjusted to 70% by adding further MIBK.

PREPARATION OF A BINDER I 1805 parts of a liquid epoxy resin based on bis-phenol A with an epoxide equivalent weight of 188 are placed in a reaction vessel provided with a stirrer, reflux condenser, internal thermometer and a nitrogen inlet, together with 450 parts of nonylphenol, 63 parts of xylene and 7 parts of dimethylbenzylamine. The reaction mixture is heated to 130° C. and maintained at this temperature until the epoxide equivalent weight reaches a value of 460. 440 parts of xylene are then added and the mixture is cooled to 80° C. A mixture of 126 parts of diethanolamine and 90 parts of N-methylethanolamine is added dropwise. The reaction is allowed to proceed at this temperature for 1 hour, after which 73 parts of ethanolamine are added dropwise, the reaction mixture is maintained for a further 2 hours at this temperature and subsequently diluted with 127 parts of hexyl glycol. A clear resin solution with a solids content of 80% and a MEQ base value of 1.45 milliequivalents/g of solid resin is obtained.

PREPARATION OF A BINDER II

The procedure for the preparation of the binder I is followed. The epoxide equivalent weight (EEW) approaches 400 in this case. The modified weights used are as follows:

| | |
|---|---|
| Epoxy resin (EEW = 188) | 2,000 |
| tert-Butylphenol | 139 |
| Xylene | 60 |
| Dimethylbenzylamine | 8 |
| Xylene | 406 |
| Diethanolamine | 280 |
| N,N-dimethylaminopropylamine | 136 |
| Hexyl glycol | 166 |
| n-propanol | 413 |

A clear resin solution with a solids content of 74.8% (measured for 1 hour at 190° C.) and a MEQ base value of 2.15 milliequivalents/g of solid resin is obtained.

PREPARATION OF A BINDER III

In a similar manner to the preparation of the binder I, 1805 parts of an epoxy resin (EEW=188), 352 parts of nonylphenol, 67 parts of xylene and 10 parts of dimethyllaurylamine are allowed to react at 130° C. until an epoxide equivalent weight of 450 is reached. A 71.3% solution of ethanolamine/methyl isobutyl ketimine in methyl isobutyl ketone is added dropwise in the course of 1 hour at this temperature. The reaction is allowed to proceed for a further 7 hours,, and the mixture is then diluted to a solids content of 83.5% (1 hour at 130° C.) with 141 parts of hexyl glycol. The resin has a MEQ base value of 1.68 milliequivalents/g of solid resin.

PREPARATION OF AQUEOUS DISPERSIONS I-IV

The binders are then converted to aqueous dispersions by mixing the components listed in the table below and adding deionized water (case 1). After 20 minutes' homogenization, the mixture is further diluted, batchwise, with deionized water (case 2). The dispersions are subsequently subjected to a brief vacuum distillation, the organic phase being separated off from the distillate.

| Dispersions | I | II | III | IV |
|---|---|---|---|---|
| Binder I | 937 | 937 | — | — |
| Binder II | — | — | 1002 | — |
| Binder III | — | — | — | 898 |
| Crosslinking agent I | — | 528 | — | 528 |
| Crosslinking agent III | — | — | 388 | — |
| Crosslinking agent IV | 528 | — | — | — |
| Dibutyltin dilaurate | — | 8 | — | 8 |
| Solution of lead(II) octoate (24% Pb) | 28 | — | 28 | — |
| Antifoam solution | 1.2 | 1.2 | 1.2 | 1.2 |
| Glacial acetic acid | 26.1 | 26.1 | 29.1 | 33.7 |
| Deionized water 1 | 748 | 748 | 820 | 780 |
| Deionized water 2 | 1493 | 960 | 2240 | 1760 |
| Solids (1 hour at 130° C.) | 31.8% | 35.1% | 26.4% | 28.5% |

PREPARATION OF A GRAY PIGMENT PASTE 800 parts of butyl glycol are added to 953 parts of a commercial epoxy resin based on bisphenol A with an epoxide equivalent weight of 890. The mixture is heated to 80° C. 221 parts of a reaction product from 101 parts of diethanolamine and 120 parts of an 80% aqueous lactic acid are then added to the resin solution. The reaction is carried out at 80° C. until the acid number has dropped below 1.

1800 parts of this product are initially taken with 2447 parts of deionized water, followed by addition of 2460 parts of $TiO_2$, 590 parts of an extender based on aluminum silicate, 135 parts of lead silicate and 37 parts of carbon black. This mixture is comminuated by grinding to a Hegman number of 5 to 7. 1255 parts of deionized water are added in order to obtain the desired paste consistency. This gray paste has a very long shelf life.

PREPARATION OF ELECTROCOATING BATHS I TO IV

The binder dispersion is mixed with the gray pigment paste in the following ratio

| Bath | | Binder | Paste |
|---|---|---|---|
| I | I | 2201 | 775 |
| II | II | 2000 | 775 |
| III | III | 2651 | 775 |
| IV | IV | 2456 | 775 |

The bath solids are adjusted to 20% with deionized water (150° C., 30 minutes). The bath is then allowed to age for 3 days, with stirring. The deposition of the paint films on zinc phosphated panels takes place in the course of 2 minutes. The bath temperature is 27° C. The deposited films are baked at 180° C. for 20 minutes.

RESULTS OF DEPOSITIONS

| | Bath I | Bath II | Bath III | Bath IV |
|---|---|---|---|---|
| Deposition voltage | 250 V | 310 V | 300 V | 270 V |
| Film thickness | 28 μm | 26 μm | 20 μm | 29 μm |
| MIBK test* | satisfactory | satisfactory | satisfactory | satisfactory |
| Course** | 1.5 | 1 | 1 | 1.5 |
| Crosshatch** | 0 | 0 | 0 | 0 |
| Erichsen indentation | 7.8 mm | 9.2 mm | 8.7 mm | 8.3 mm |

*20 double rubs with a cottonwool wad soaked in MIBK
**0 = best, 5 = worst

We claim:
1. A method of electrocoating a substrate comprising; cathodically electrodepositing onto said substrate a crosslinkable binder composition comprised of a cationic reaction product of:
    (a) a self-polyaddition product of a diepoxide compound and a monofunctionally reacting initiator carrying an alcoholic —OH group, a phenolic —OH group or an —SH group,
    the diepoxide compound and the initiator being incorporated in a molar ratio of greater than about 2:1 to about 10:1, the product of said polyaddition comprising a polyepoxide-polyether, the synthesis being conducted under reaction conditions sufficient to produce a polymer having a polyether backbone with pendant unreacted epoxy groups, and
    (b) an amine, sulfide or phosphine compound comprised of a primary amine, a secondary amine, a mixture or a salt thereof, a salt of a tertiary amine, a sulfide/acid mixture;, a phosphine/acid mixture or a mixture of any of said amines, sulfide/acids or phosphine/acids.
2. A method in accordance with claim 1 wherein component (b) comprises an amine acid salt, and wherein the ratio of amine acid salt to diepoxide compound is about 1 to 50 parts by weight of the amine acid salt to 100 parts by weight of epoxide.
3. The method of claim 1 wherein the binder further comprises a crosslinking agent.
4. The method of claim 3 wherein the binder is self-crosslinkable.
5. The method of claim 1 wherein component (b) is a sulfide and the ratio between said sulfide and said epoxide compound is about 1 to 50 parts by weight of sulfide to 100 parts by weight of said epoxide compound.
6. The method of claim 1 wherein component (b) is a phosphine, and the ratio between said phosphine and said epoxide compound is about 1 to about 50 parts by weight of phosphine to 100 parts by weight of said epoxide.

* * * * *